US005933202A

United States Patent [19]

Watanabe et al.

[11] Patent Number: 5,933,202

[45] Date of Patent: Aug. 3, 1999

[54] LIQUID CRYSTAL DISPLAY DEVICE HAVING AN ALTERNATING COMMON ELECTRODE VOLTAGE

[75] Inventors: Makoto Watanabe; Osamu Sukegawa; Kohji Nakashima, all of Tokyo, Japan

[73] Assignee: NEC Corporation, Tokyo, Japan

[21] Appl. No.: 08/719,961

[22] Filed: Sep. 24, 1996

[30] Foreign Application Priority Data

Sep. 28, 1995 [JP] Japan .................................... 7-274845

[51] Int. Cl.$^{6}$ .............................. G02F 1/133; G09G 3/36

[52] U.S. Cl. .................................. 349/33; 349/34; 345/94

[58] Field of Search ................................ 349/34, 33, 167, 349/36; 345/94, 53, 208, 96

[56] References Cited

U.S. PATENT DOCUMENTS

| | | | |
|---|---|---|---|
| 4,319,237 | 3/1982 | Matsuo et al. | 349/33 |
| 5,026,144 | 6/1991 | Taniguchi et al. | 349/34 |
| 5,245,455 | 9/1993 | Sayyah et al. | 349/34 |
| 5,260,817 | 11/1993 | Kaneko et al. | 349/37 |
| 5,561,442 | 10/1996 | Okada et al. | 345/94 |

FOREIGN PATENT DOCUMENTS

| | | |
|---|---|---|
| 1-149983 | 6/1989 | Japan . |
| 45629 | 1/1992 | Japan . |
| 4102828 | 4/1992 | Japan . |

*Primary Examiner*—William L. Sikes
*Assistant Examiner*—Kenneth Parker
*Attorney, Agent, or Firm*—Sughrue, Mion, Zinn, Macpeak & Seas, PLLC

[57] ABSTRACT

An active-matrix liquid crystal display device applies a voltage modulated with a high-frequency AC voltage to a common electrode disposed on a substrate which confronts a substrate having a plurality of thin-film transistors as switching elements for pixel electrodes. The modulated voltage applied to the common electrode is effective to reduce the phenomenon of a residual image retained for a long period of time; thereby improving the quality of displayed images.

5 Claims, 16 Drawing Sheets

LIQUID CRYSTAL DISPLAY DEVICE HAVING AN ALTERNATING COMMON ELECTRODE VOLTAGE

BACKGROUND OF THE INVENTION

1. Field of the Invention

The present invention relates to a liquid crystal display device, and more particularly to a liquid crystal display device having thin-film transistors used as switching elements.

2. Description of the Related Art

Liquid crystal display devices have a liquid crystal layer sandwiched between two electrodes which apply an electric field to the liquid crystal layer for controlling the transmittance degree of light that passes through the liquid crystal layer.

One system for applying an electric field to the liquid crystal layer is known as a static drive system which constantly supplies a fixed voltage signal to each of the electrodes. If the liquid crystal display device driven by the static drive system is designed to display a large amount of information, however, it requires a huge number of signal lines to be connected to the electrodes.

Heretofore, a liquid crystal display device for displaying a large amount of information is associated with a multiplex drive system which supplies signal voltages on the multiplex time-division principles.

One type of such a multiplex drive system is referred to as an active-matrix drive system which holds an electric charge applied to an electrode until a next frame. The active-matrix drive system allows the liquid crystal display device to display images of high quality. Some liquid crystal display devices that are driven by the active-matrix drive system employ thin-film transistors (TFT) which have excellent charge holding characteristics. Such TFT liquid crystal display devices are used as display devices which are required to display high-contrast images of high quality.

FIG. 1 shows a cross section of a general TFT liquid crystal display device. A polarizer (polarizing film), etc. are omitted illustration in FIG. 1.

The TFT liquid crystal display device shown in FIG. 1 comprises an insulating film 12 of silicon nitride, for example, disposed on a glass substrate 10. Transparent electrodes 11 (also referred to as pixel electrodes) are arranged in a matrix on the insulating film 12, making up matrix segments.

An amorphous silicon film 13 is also disposed on the insulating film 12. A plurality of longitudinal drain electrodes 14 are disposed on the insulating film 12 in overlapping relation to the amorphous silicon film 13, and are connected to drain lines (not shown), which may be referred to as data lines or signal lines.

A source electrode 15 is connected to the transparent electrodes 11 in overlapping relation to the amorphous silicon film 13.

A gate electrode 17 is formed between the glass substrate 10 and the insulating film 12, and connected to a plurality of transverse gate lines (not shown), which may be referred to as scan lines.

The gate electrode 17 is disposed underneath the amorphous silicon film 13 at a gap between the source electrode 14 and the drain electrode 15.

As shown in FIG. 5 of the accompanying drawings, a drain line D, a gain line G, a source line S, and an amorphous silicon film connected to these lines D, S, G jointly make up a thin-film field-effect transistor (FET) which serves as a switching element (switching transistor).

The transparent electrodes 11 are connected to the drain line through the switching elements .

In FIG. 1, the switching elements, the drain line (drain electrode), and the gate line (gate electrode) are covered with and protected by a passivation film 16 of silicon nitride.

In order to orient liquid crystal molecules, an orientation film 18 of an organic material is disposed on the passivation film 16.

A glass substrate 20 supports a transparent common electrode 21 and an orientation film 28 on its lower surface facing towards the glass substrate 10. A liquid crystal layer 3 is sealed between the orientation films 18, 28.

When the switching transistor of each of the matrix segments is turned on or rendered conductive, an electric field is developed between the transparent electrodes 11, 21, causing the liquid crystal layer 3 to produce an electro-optic effect to display an image on the entire TFT liquid crystal display device.

As shown in FIG. 2, a DC voltage which is identical to the central value of a pixel electrode potential is applied to the common electrode 21 at an intermediate tone. A potential (Vcom) of the common electrode 21 with respect to a pixel electrode potential is shown in FIG. 3.

FIG. 4 shows the conventional liquid crystal display device which includes a circuit for applying the DC voltage to the common electrode 21.

As shown in FIG. 4, the circuit includes a voltage offset circuit 31 connected as a voltage divider between a power supply and ground for producing a variable voltage. The voltage offset circuit 31 sets the central potential value (intermediate potential) of the common electrode 21 to the central value of the pixel electrode potential (see FIG. 2) for displaying an intermediate tone.

However, the conventional liquid crystal display device with the voltage offset circuit for setting the central potential value of the common electrode to the central value of the pixel electrode potential is disadvantageous in that a displayed pattern causes a residual image to be left for a long period of time, degrading display characteristics. Such a residual image is explained below.

The potential central value differs with the displayed gradation. Therefore, when a gradation pattern other than the intermediate tone is displayed, a DC component is applied to the liquid crystal cells within the gradation pattern, causing impurity ions in the liquid crystal cells or the orientation films 18, 28 to produce an electric double layer which results in an internal potential. The internal potential varies the effective voltage in the pattern, producing a brightness difference.

Japanese Patent Laid-open No. 149983/1989 discloses an arrangement for attracting impurity ions to one side of a liquid crystal display panel under an internal electric field.

According to the disclosed arrangement, however, if the orientation films have a high ion absorption capability, then impurity ions are absorbed to the orientation films while they are being attracted to one side of the liquid crystal display panel, thereby tending to produce an electric double layer. If the orientation films are prone to fixed polarization, then they are unable to suppress a residual image that is left for a long period of time.

SUMMARY OF THE INVENTION

It is therefore an object of the present invention to provide a liquid crystal display device which is capable of reducing a residual image present for a long period of time when patterns of different gradations are displayed on the same screen for a long period of time.

To accomplish the above object, there is provided in accordance with the present invention a liquid crystal display device comprising a matrix of pixel electrodes, a transistor mounted substrate having a plurality of thin-film transistors as switching elements for said pixel electrodes, respectively, a confronting substrate disposed in confronting relation to said transistor mounted substrate and having a confronting common electrode, a liquid crystal material sealed between the substrates, a drive circuit for applying a voltage between said pixel electrodes and said common electrode, and means for applying a high-frequency voltage signal to said common electrode.

The high-frequency voltage signal preferably comprises a voltage signal produced by modulating a DC voltage with an AC voltage signal having a predetermined frequency.

The DC voltage preferably has a level set to a substantially central level of a potential of the pixel electrode at the time of displaying an intermediate tone.

The high-frequency voltage signal preferably comprises a voltage signal having a frequency in a microwave frequency range.

The liquid crystal material preferably comprises a material which is low in its responsiveness to high frequencies.

Since the high-frequency signal, in addition to a conventional DC component (Vcom), is applied to the common electrode which confronts the pixel electrodes, the polarity of the potential of the common electrode with respect to the pixel electrodes is inverted at a high frequency. As a result, it is possible to reduce or prevent an electric double layer due to residual ions in a liquid crystal cell and also reduce or prevent polarization in orientation films, so that any residual image will not be retained for a long period of time after the same pattern has been displayed for a long period of time.

The above and other objects, features, and advantages of the present invention will become apparent from the following description referring to the accompanying drawings which illustrate examples of preferred embodiments of the present invention.

BRIEF DESCRIPTION OF THE DRAWINGS

FIG. 6(*b*) is a view showing the manner in which electric charges move in the liquid crystal layer and the orientation films are polarized when the common electrode potential is positive with respect to the pixel electrode potential;

DETAILED DESCRIPTION OF THE PREFERRED EMBODIMENTS

Prior to the description of the embodiments of the present invention, the mechanism of the phenomenon of a residual image that is left for a long period of time will first be described in detail below.

Figure 15:
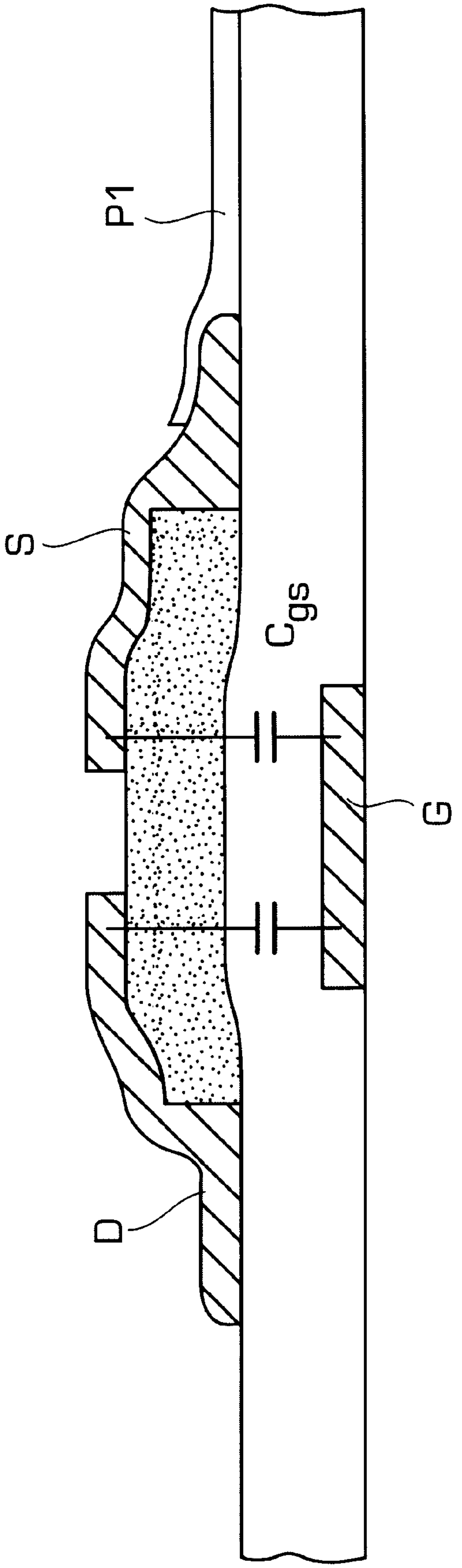
FIG. 15 is a view showing a gate-source parasitic capacitance of a TFT.

FIG. 15 shows a gate-source parasitic capacitance of a TFT. In a TFT liquid crystal display device, a gate-source parasitic capacitance Cgs is developed in an overlapping region between a gate electrode G and a source electrode S and a drain electrode D in a liquid crystal panel and a TFT element.

Figure 5:
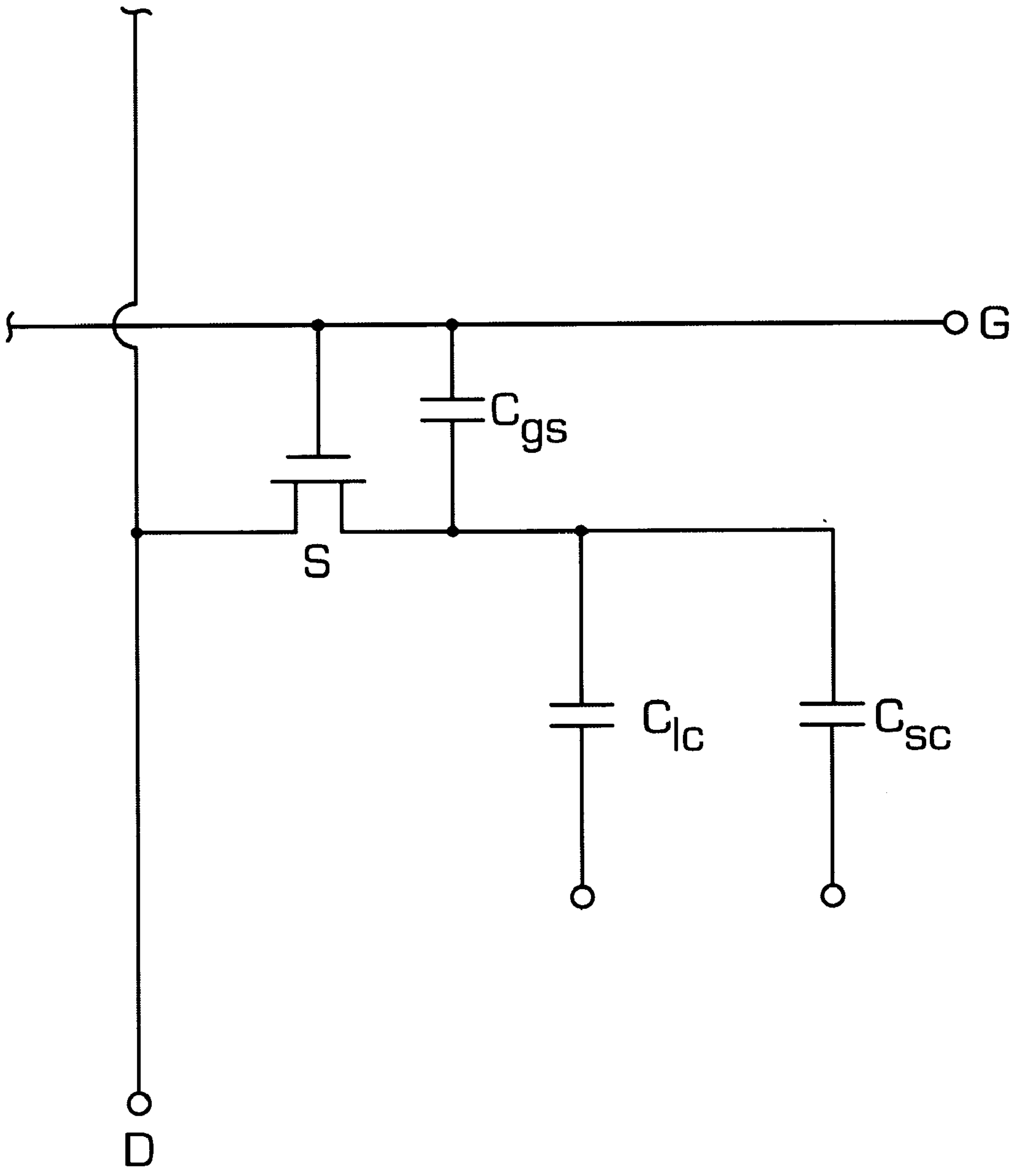
FIG. 5 is a circuit diagram of a general equivalent circuit of a TFT.

FIG. 5 shows a equivalent circuit per pixel of a liquid crystal display device having TFT elements.

The equivalent circuit includes a gate-source parasitic capacitance Cgs of a TFT element, a capacitance Clc of a liquid crystal layer between transparent electrodes, and an auxiliary capacitance Csc.

Figure 7:
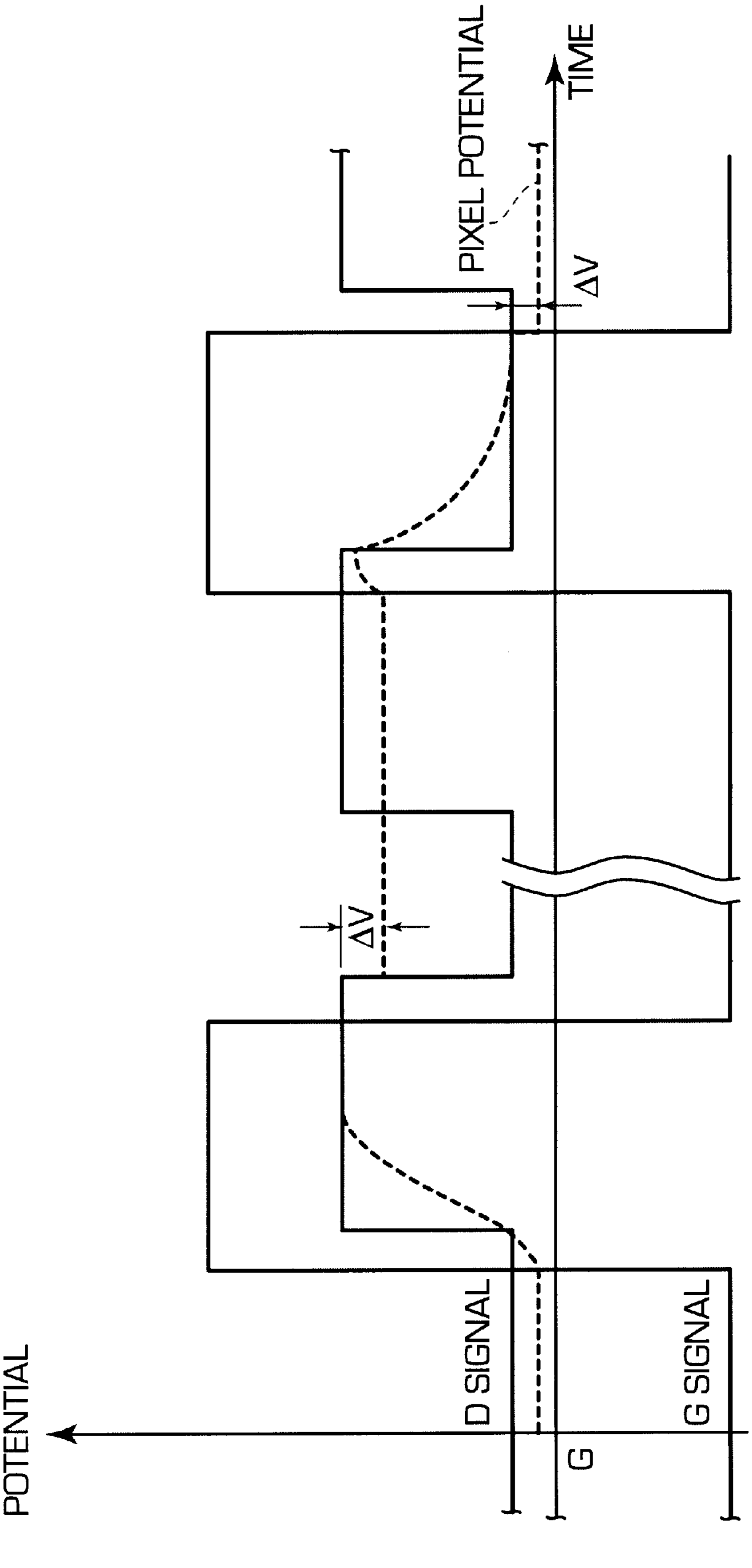
FIG. 7 is a diagram showing the manner in which the pixel electrode potential varies with time.

When the gate of the TFT is turned on with a voltage of 18–20 V, an electric charge is gradually built up in a pixel electrode, increasing a pixel electrode potential as shown in FIG. 7. When the gate of the TFT is turned off with a voltage of −10–−15 V, the electric charge leaks from the pixel electrode into the gate-source parasitic capacitance Cgs, resulting in a drop ΔV of the potential of the pixel electrode. In FIG. 7, a D signal represents the waveform of a voltage signal on a data line, and a G signal represents the waveform of a voltage signal on a gate line.

The drop ΔV of the potential of the pixel electrode is determined according to the following equation (1):

$$\Delta V=\{Cgs/(Clc+Csc+Cgs)\}(Vgon-Vgoff) \quad (1)$$

where Vgon and Vgoff represent respective voltages by which the gate of the TFT is turned on and off.

Because of the potential drop ΔV, the voltage actually applied to the liquid crystal layer is shifted ΔV negatively with respect to the applied drain voltage.

Since the capacitance Clc of the liquid crystal layer between transparent electrodes differs depending on the displayed image on the liquid crystal display device, the potential drop ΔV differs depending on the displayed image (white, intermediate tone, or black).

Specifically, when the liquid crystal molecules are fully vertically oriented, displaying a black image, the capacitance Clc of the liquid crystal layer between transparent electrodes is maximum and the potential drop ΔV is minimum. When the liquid crystal molecules are fully horizontally oriented, displaying a white image, the capacitance Clc of the liquid crystal layer between transparent electrodes is minimum and the potential drop ΔV is maximum.

Therefore, when a DC voltage of 4–5 V adjusted to the central value of the pixel electrode potential at an intermediate tone which is highly visually sensitive is applied to the common electrode 21, a DC component Vdc expressed by the following equation (2) is applied to the liquid crystal layer:

$$Vdc = \Delta Vmid - \Delta V \quad (2)$$

where ΔVmid is a potential drop ΔV at the time an intermediate tone is displayed.

Consequently, the DC component Vdc differs largely in polarity and magnitude depending on the displayed tone.

Figure 6B:
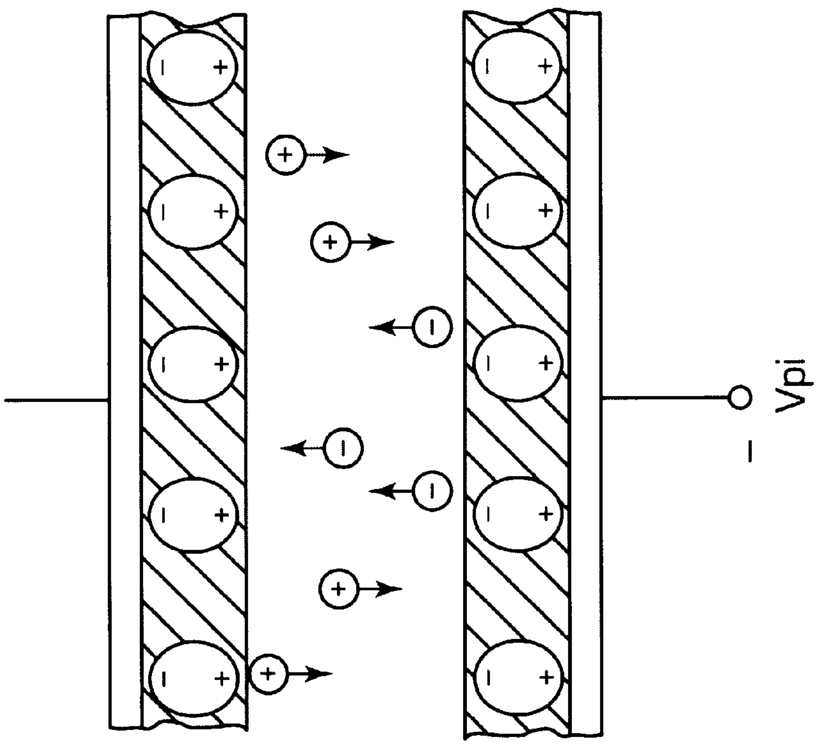
FIG. 6(*a*) is a view showing the manner in which electric charges move in a liquid crystal layer and orientation films are polarized when a common electrode potential is negative with respect to a pixel electrode potential.
Figure 6A:
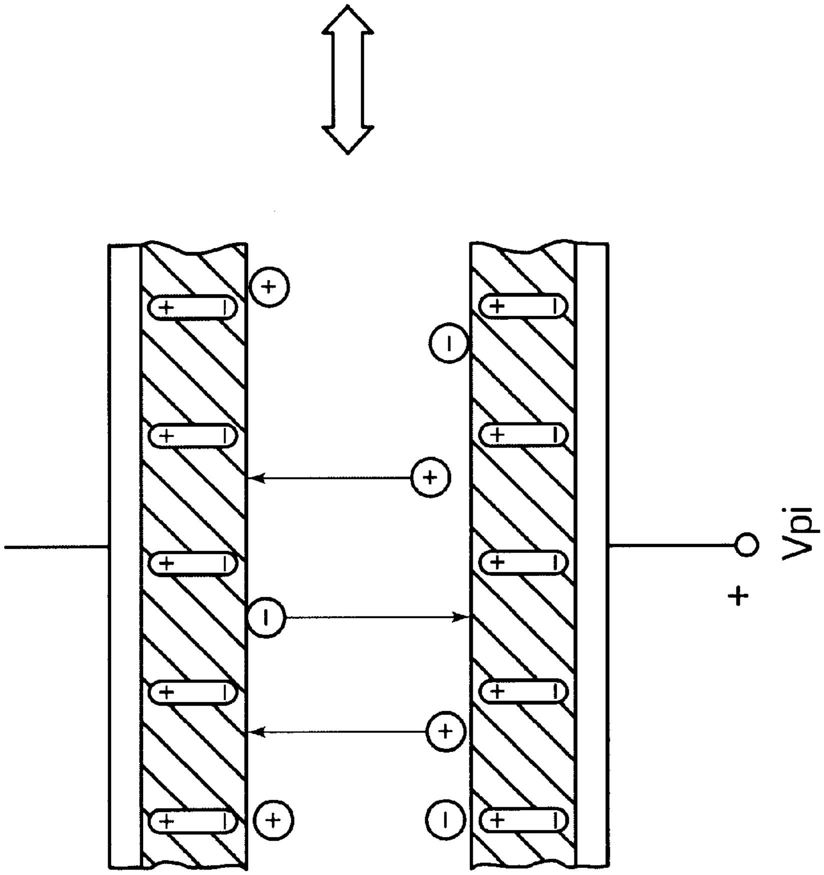

When the DC component Vdc is applied to the liquid crystal layer, residual ions are moved in the liquid crystal layer and attracted to the orientation films, producing an electric double layer in the liquid crystal cell as shown in FIGS. 6(*a*) and 6(*b*). In the liquid crystal layer, there is generated an internal potential. In the region where the internal potential is generated, a voltage lower than a predetermined voltage to be applied is applied to the liquid crystal layer, increasing the transmittance degree of light through the liquid crystal panel.

After patterns of different gradations are displayed for a long period of time, therefore, the difference between transmittance degrees is developed in the region where the patterns were displayed, causing a residual image to be left for a long period of time. As a result, the quality of displayed images on the liquid crystal panel is lowered.

The phenomenon of a residual image left for a long period of time takes place according to the above mechanism.

A liquid crystal display device according to a first embodiment of the present invention will be described below with reference to FIGS. 8 through 11.

Figure 8:
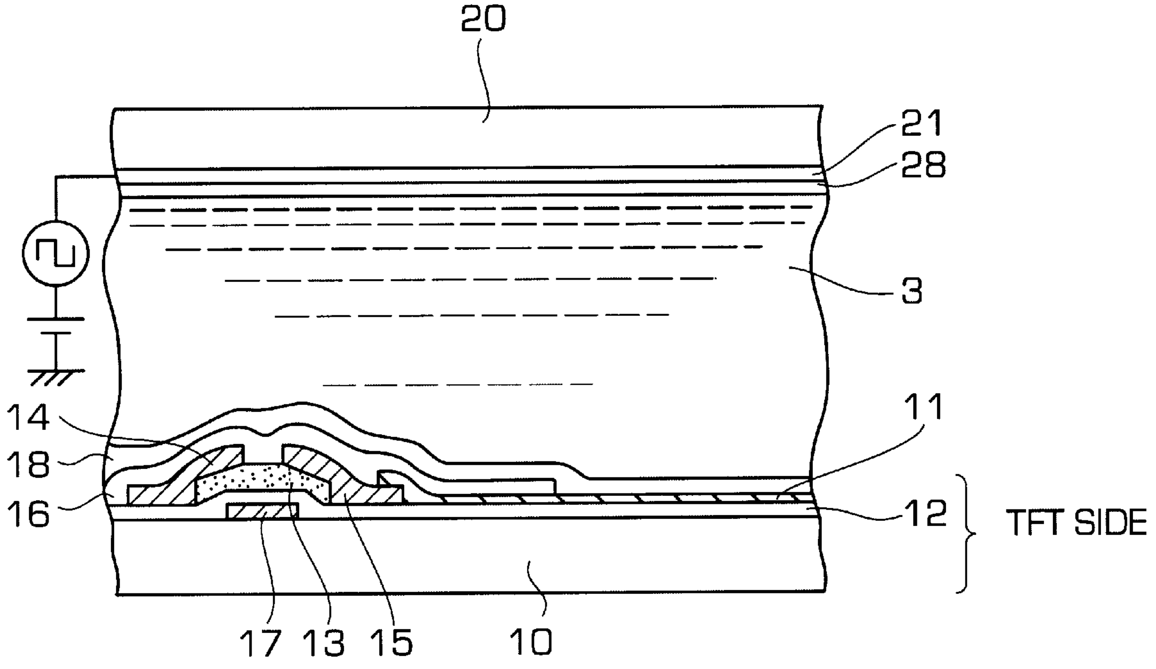
FIG. 8 is a fragmentary cross-sectional view of a liquid crystal display device according to a first embodiment of the present invention.

FIG. 8 fragmentarily shows a cross section of the liquid crystal display device according to the first embodiment of the present invention. Those parts shown in FIG. 8 which are identical to those shown in FIG. 1 are denoted by identical reference numerals, and will not be described in detail below.

Figure 1:
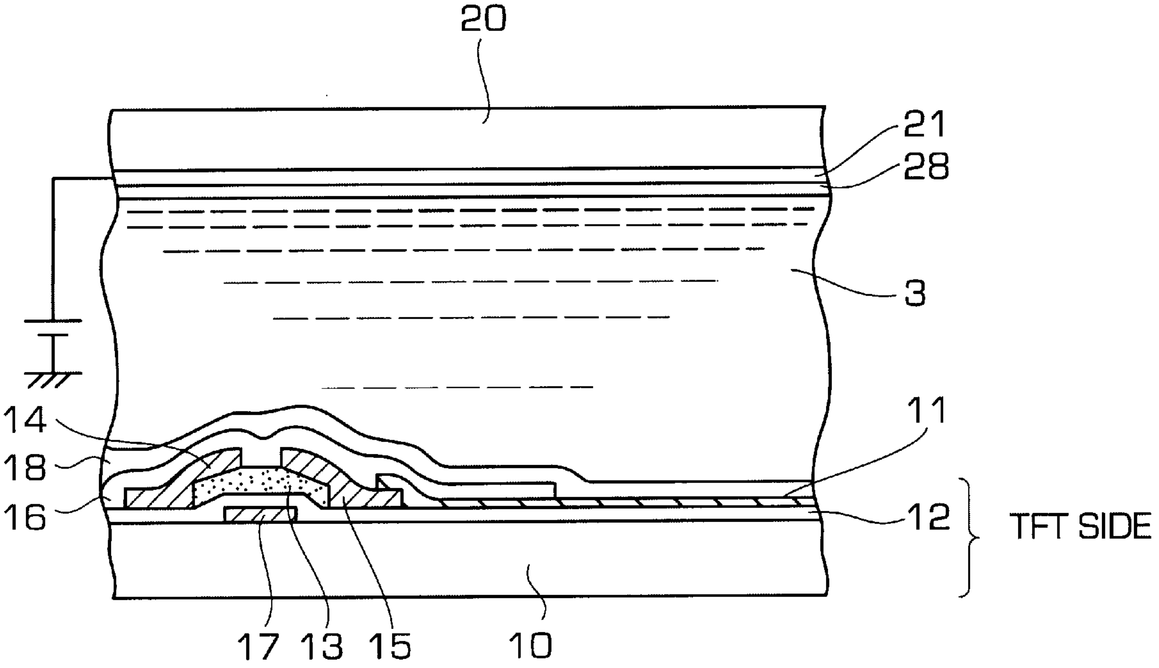
FIG. 1 PRIOR ART
FIG. 1 is a fragmentary cross-sectional view of a conventional liquid crystal display device.
Figure 2:
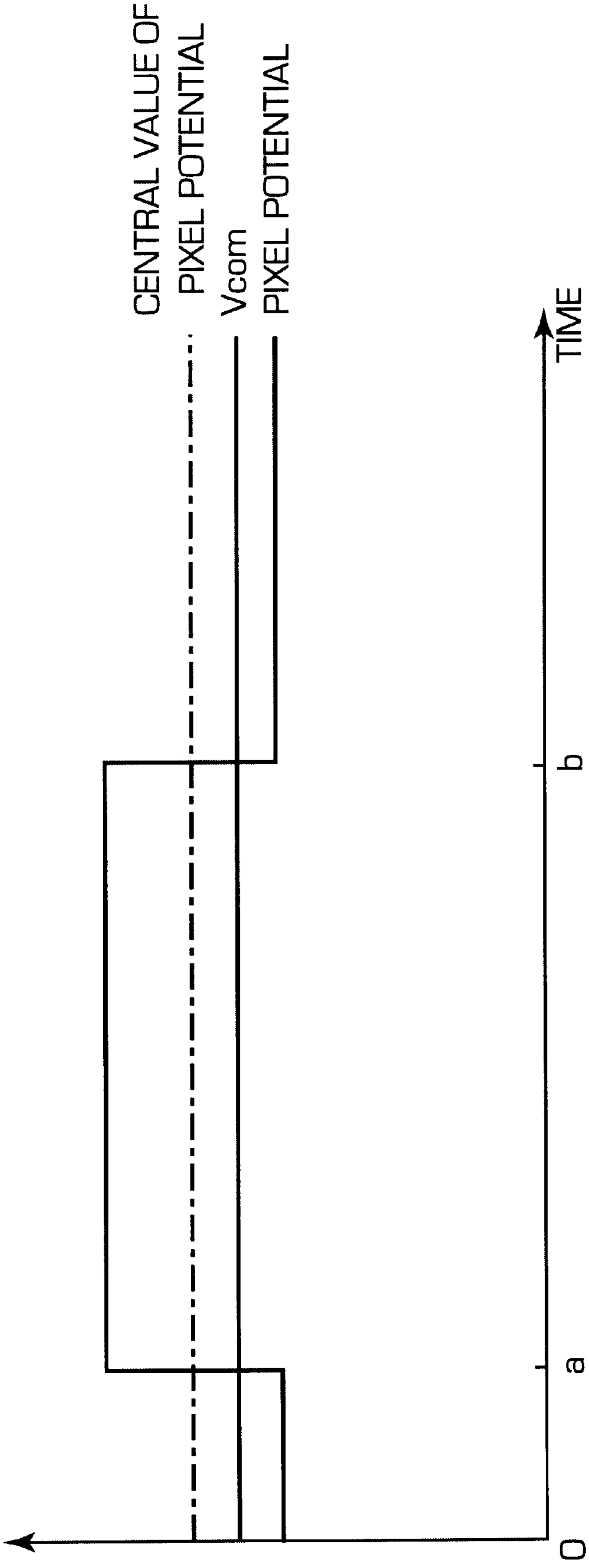
FIG. 2 PRIOR ART
FIG. 2 is a diagram showing the waveform of a voltage applied to a common electrode of the conventional liquid crystal display device.
Figure 3:
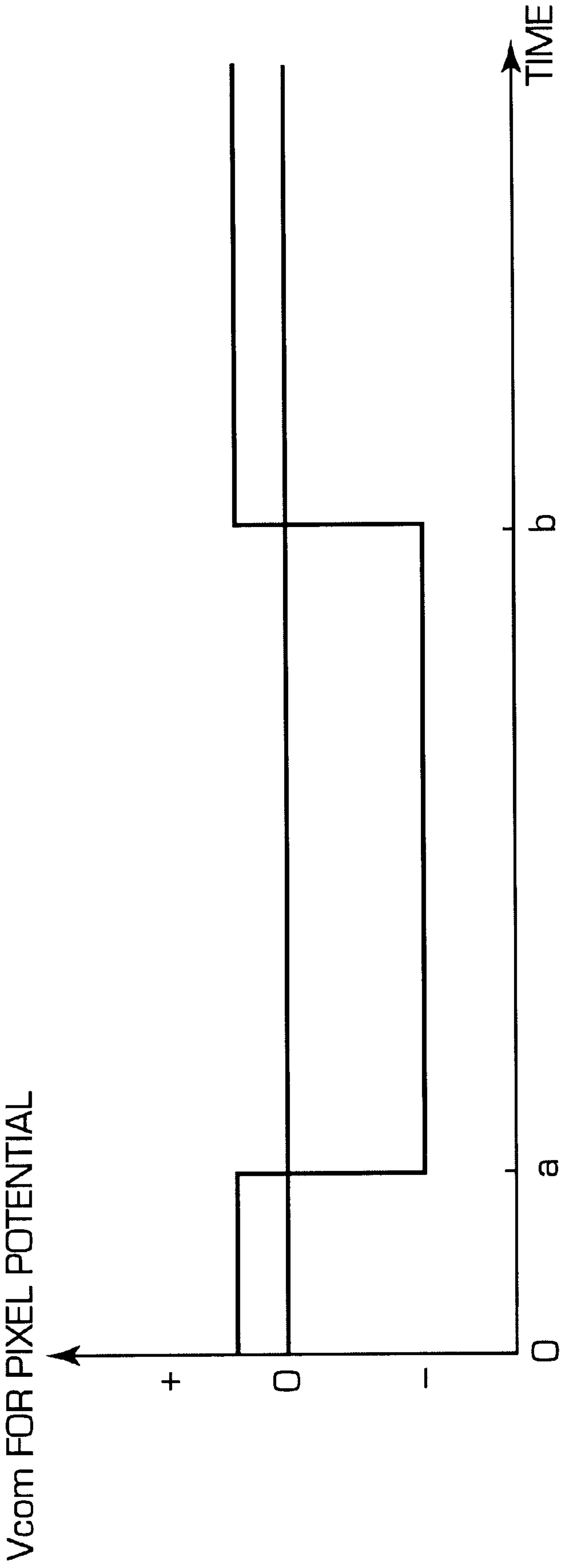
FIG.3 PRIOR ART
FIG. 3 is a diagram showing a common electrode potential with respect to a pixel electrode potential of the conventional liquid crystal display device.
Figure 4:
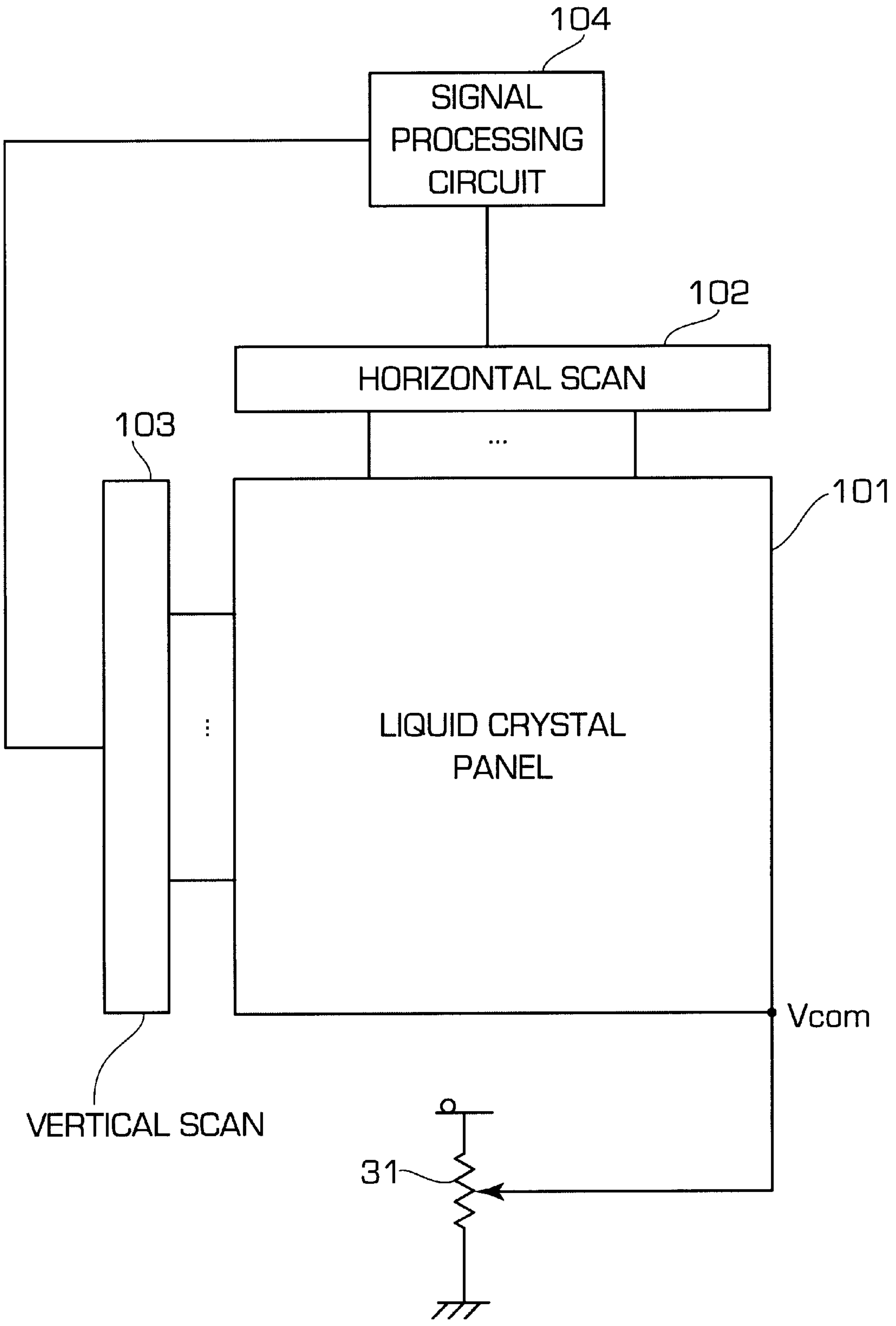
FIG. 4 is a block diagram of the conventional liquid crystal display device.
Figure 9:
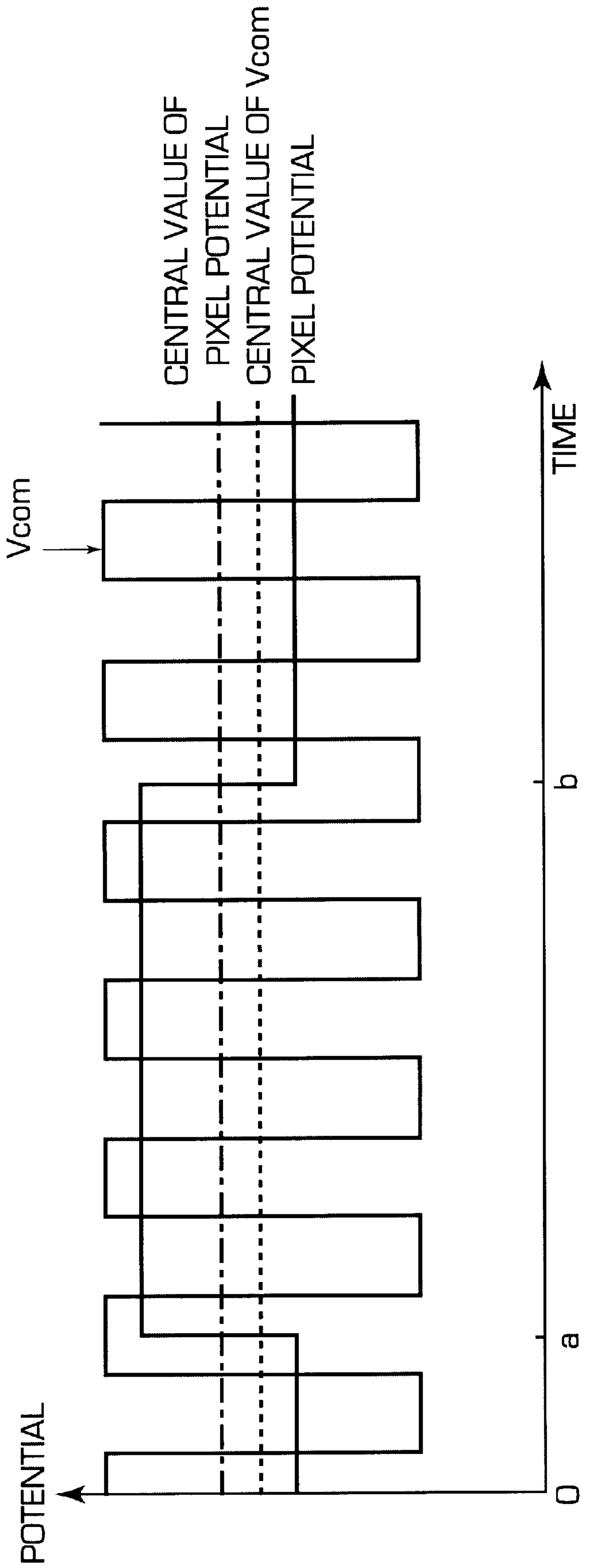
FIG. 9 is a diagram showing the waveform of a voltage applied to a common electrode of the liquid crystal display device according to the first embodiment.
Figure 10:
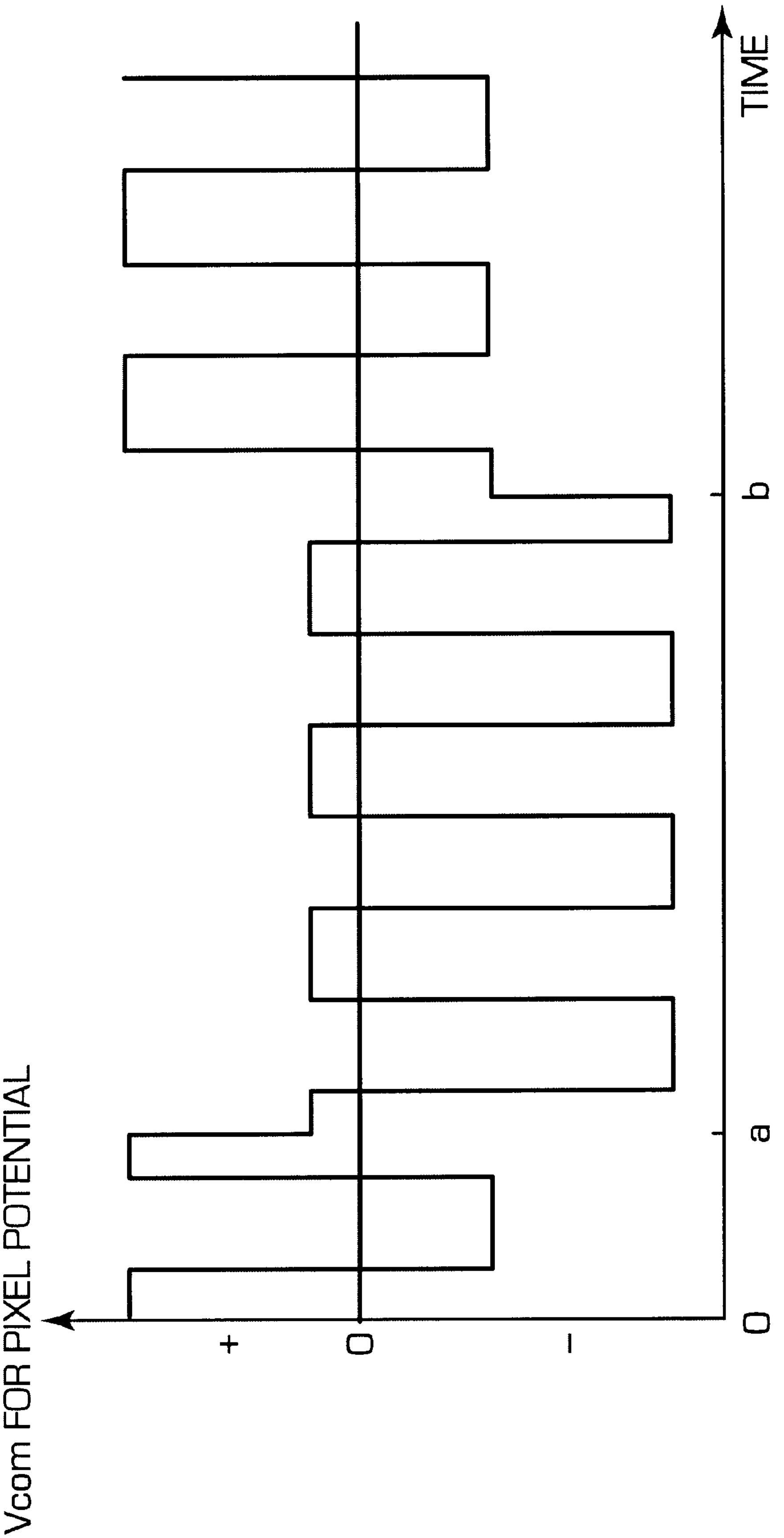
FIG. 10 is a diagram showing the waveform of a common electrode voltage with respect to a pixel electrode potential in the liquid crystal display device according to the first embodiment.

The liquid crystal display device according to the first embodiment differs from the conventional liquid crystal display device shown in FIGS. 1 and 2 in that a DC voltage applied to common electrode 21 is modulated by a high-frequency AC voltage as shown in FIG. 9. In FIG. 9, the dot-and-dash line represents the central value of a pixel electrode potential, and the broken line represents the central value of the common electrode potential. A potential (Vcom) of common electrode 21 with respect to the pixel electrode potential is shown in FIG. 10.

The DC voltage applied to common electrode 21 is set to the central value of the pixel electrode potential at an intermediate tone, which is the same as the conventional liquid crystal display device, and the effective DC voltage Vdc when another gradation is displayed remains the same as the conventional liquid crystal display device.

Figure 16:
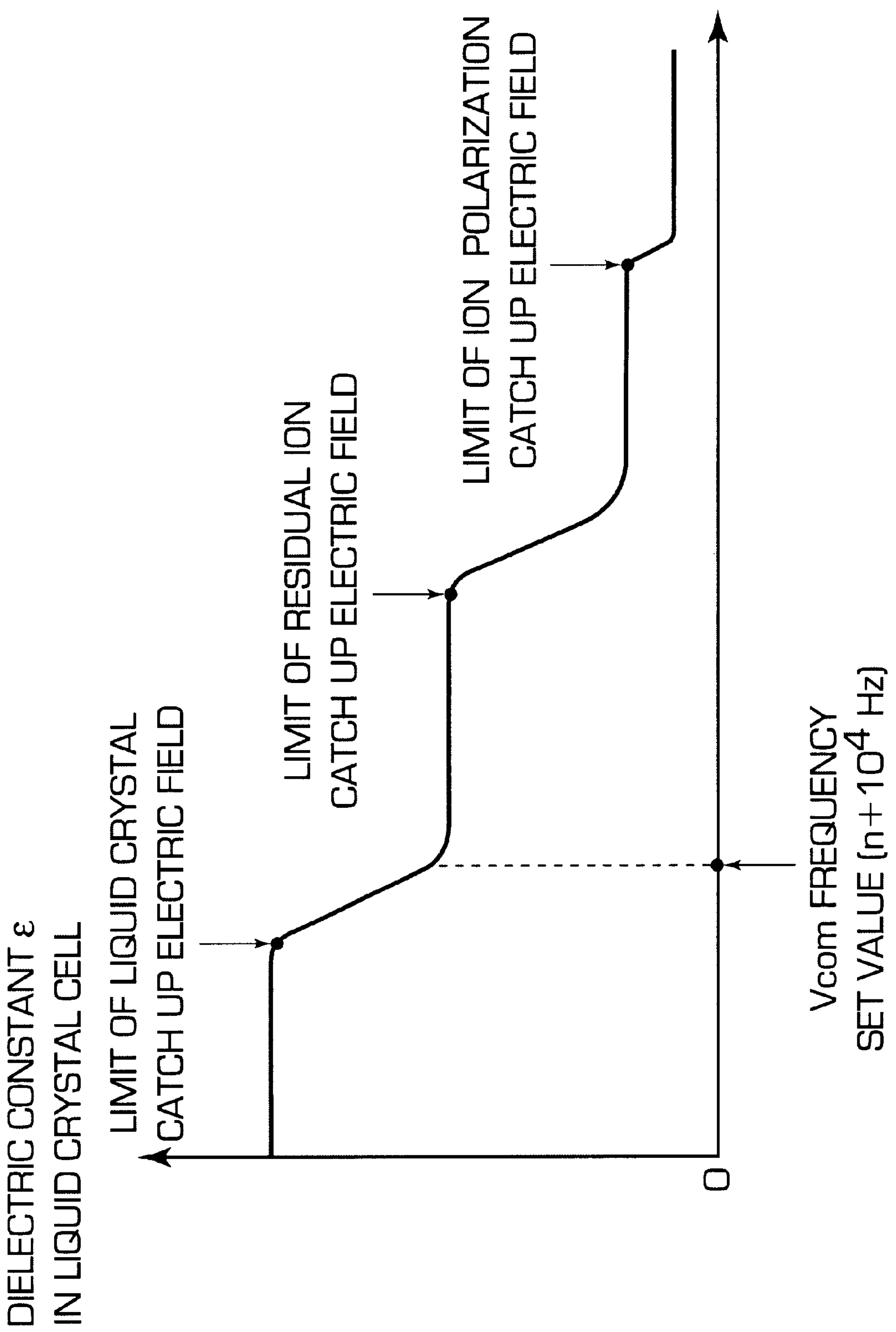
FIG. 16 is a diagram showing frequency characteristics of a dielectric constant in a liquid crystal cell.

In the first embodiment, the frequency of the AC voltage is established as follows:

When an AC voltage with its central value being of 0 V is applied to a liquid crystal layer 3 shown in FIG. 8, the dielectric constant in the liquid crystal cell varies as shown in FIG. 16 when the frequency of the AC voltage is varied.

In FIG. 16, the dielectric constant in the liquid crystal cell varies in three steps. In a low frequency range, since the liquid crystal, residual ions in the liquid crystal cell and ion polarization in the orientation film can catch up with the electric field, the overall dielectric constant is equal to the sum of their dielectric constants. At this time, the liquid crystal molecules are vertically oriented.

When the frequency of the AC voltage increases to a microwave frequency range, the liquid crystal molecules become unable to catch up with the electric field. Therefore, the overall dielectric constant decreases.

When the frequency of the AC voltage further increases, the residual ions in the liquid crystal cell also become unable to catch up with the electric field, resulting in a further reduction in the overall dielectric constant.

If the frequency of the AC voltage is too low, then the liquid crystal can sufficiently catch up with the oscillating electric field, with the result that no desired brightness is achieved and image flickering increases on the liquid crystal panel.

If the frequency of the AC voltage is too high, e.g., in a far-infrared frequency range or a visible ray frequency range, then both the residual ions in the liquid crystal cell and the ion polarization in the orientation film are unable to catch up with the electric field. Consequently, an electric charge distribution is fixed for a long period of time, causing a residual image to be left for a long period of time.

Accordingly, the frequency of the AC voltage is set to such a value that the residual ions in the liquid crystal cell and the ion polarization in the orientation film are able to catch up with the electric field, whereas the liquid crystal is unable to catch up with the electric field. Specifically, the frequency of the AC voltage is set to a frequency of about $10^9$ Hz in the microwave frequency range.

The amplitude of the AC voltage is selected to be larger than the maximum value of the drain amplitude so that the polarity will be inverted at a large frequency. Specifically, the amplitude of the AC voltage is selected to be 6–7 V.

Figure 11:
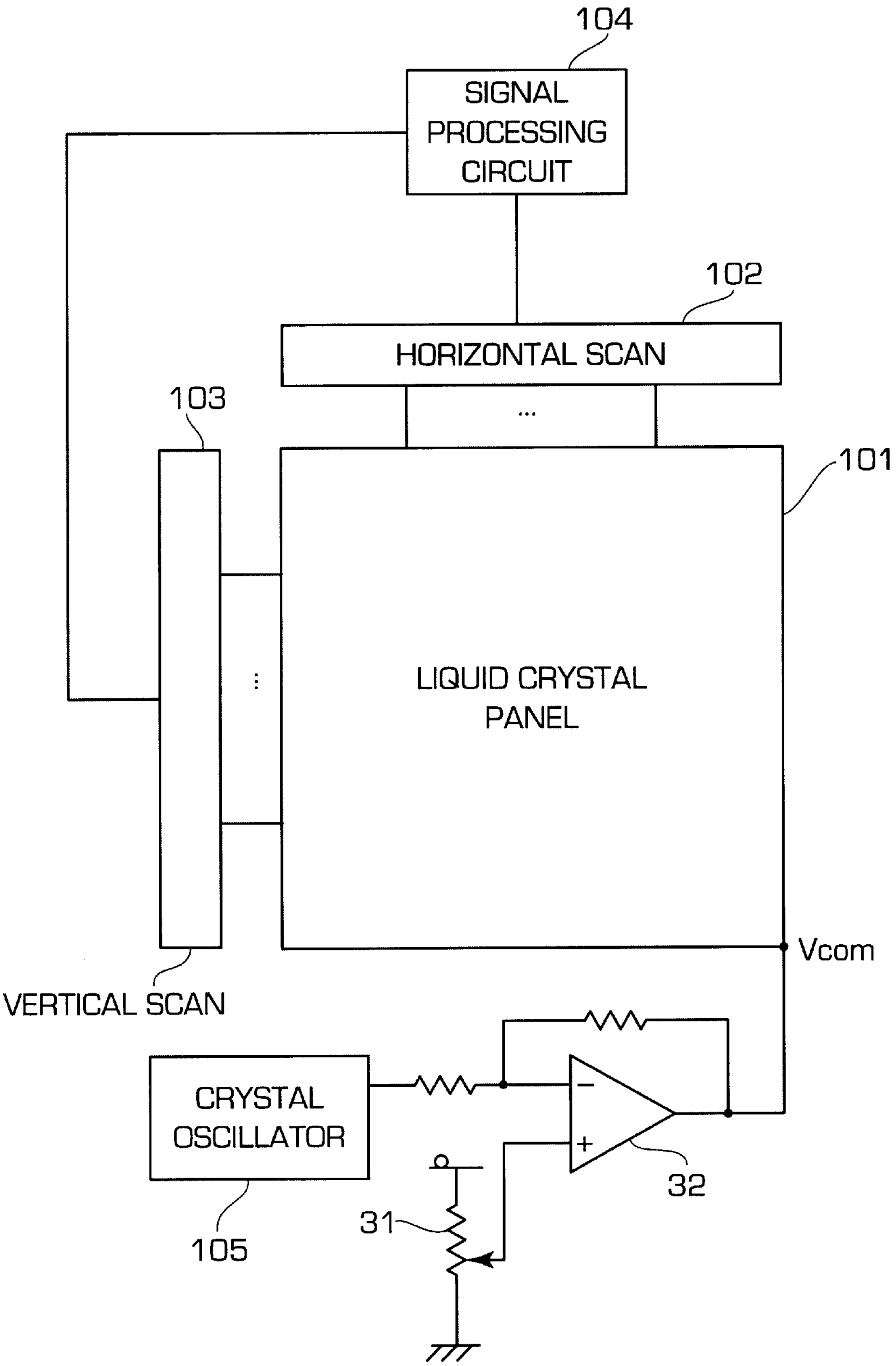
FIG. 11 is a block diagram of the liquid crystal display device according to the first embodiment.

FIG. 11 shows a block diagram of the liquid crystal display device according to the first embodiment, associated with a circuit for applying an AC voltage between confronting substrates.

In FIG. 11, a high-frequency crystal oscillator 105 capable of oscillating at a frequency on the order of gigahertz supplies an oscillating signal to an inverted input terminal of operational amplifier 32, which amplifies the signal to a voltage ranging from 6 to 7 V and applies the amplified signal to a common electrode of liquid crystal panel 101.

Voltage offset circuit 31 supplies a variable voltage to a non-inverted input terminal of operational amplifier 32, setting the central value of the common electric potential to the central value of a pixel electrode potential at the time of displaying an intermediate tone.

Since the common electrode potential is applied as described above, the DC component Vdc remains effectively constant, but the polarity is inverted frequently with time, reducing the tendency for the residual ions and the polarization in the orientation films to be fixed.

Since the liquid crystal does not catch up with high-frequency oscillation, the high-frequency oscillation does not adversely affect the quality of displayed images. If liquid crystal layer 3 is made of a material which is low in its responsiveness to high frequencies, then the frequency of the AC voltage applied to common electrode 21 can be set to a relatively low value. This is advantageous because the liquid crystal display device consumes a relatively low amount of electric energy.

A liquid crystal display device according to a second embodiment of the present invention will be described below with reference to FIGS. 12 through 14.

The liquid crystal display device according to the second embodiment has a physical structure which is the same as that of the liquid crystal display device according to the first embodiment. According to the second embodiment, an AC voltage shown in FIG. 12 is applied to the common electrode.

Figure 12:
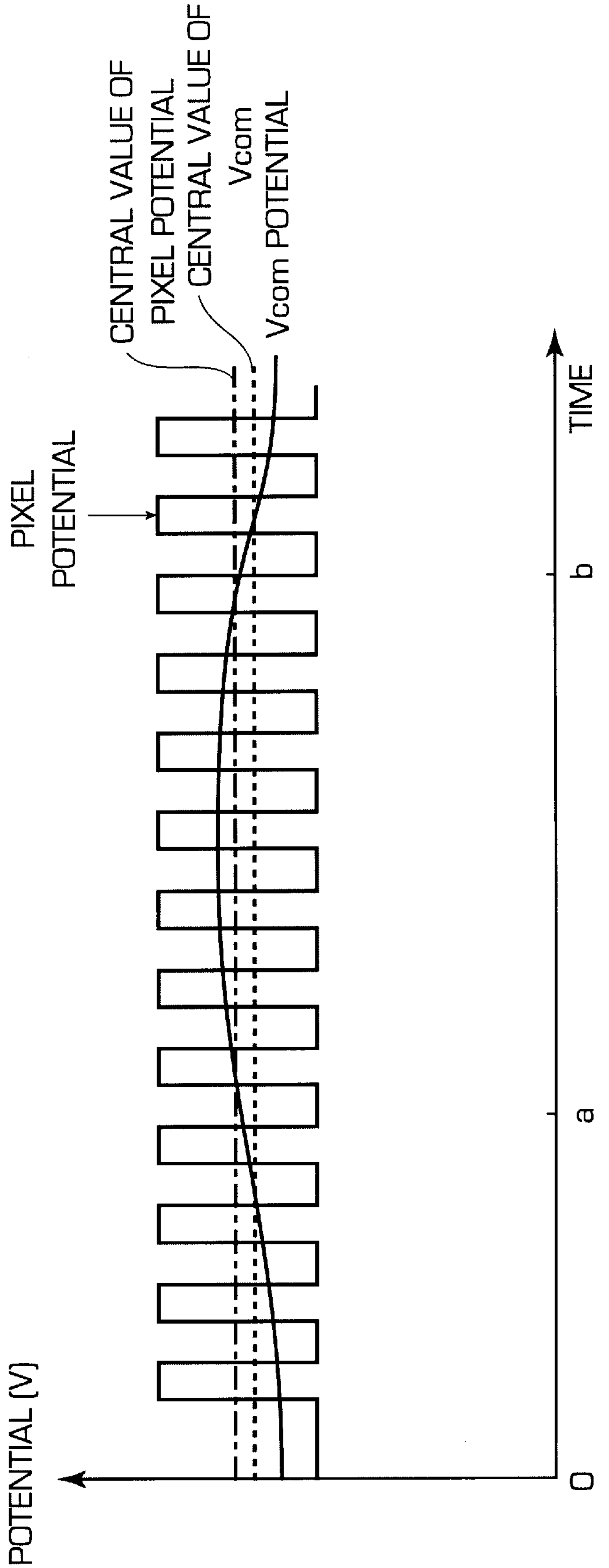
FIG. 12 is a diagram showing the waveform of a voltage applied to a common electrode of a liquid crystal display device according to a second embodiment of the present invention.
Figure 13:
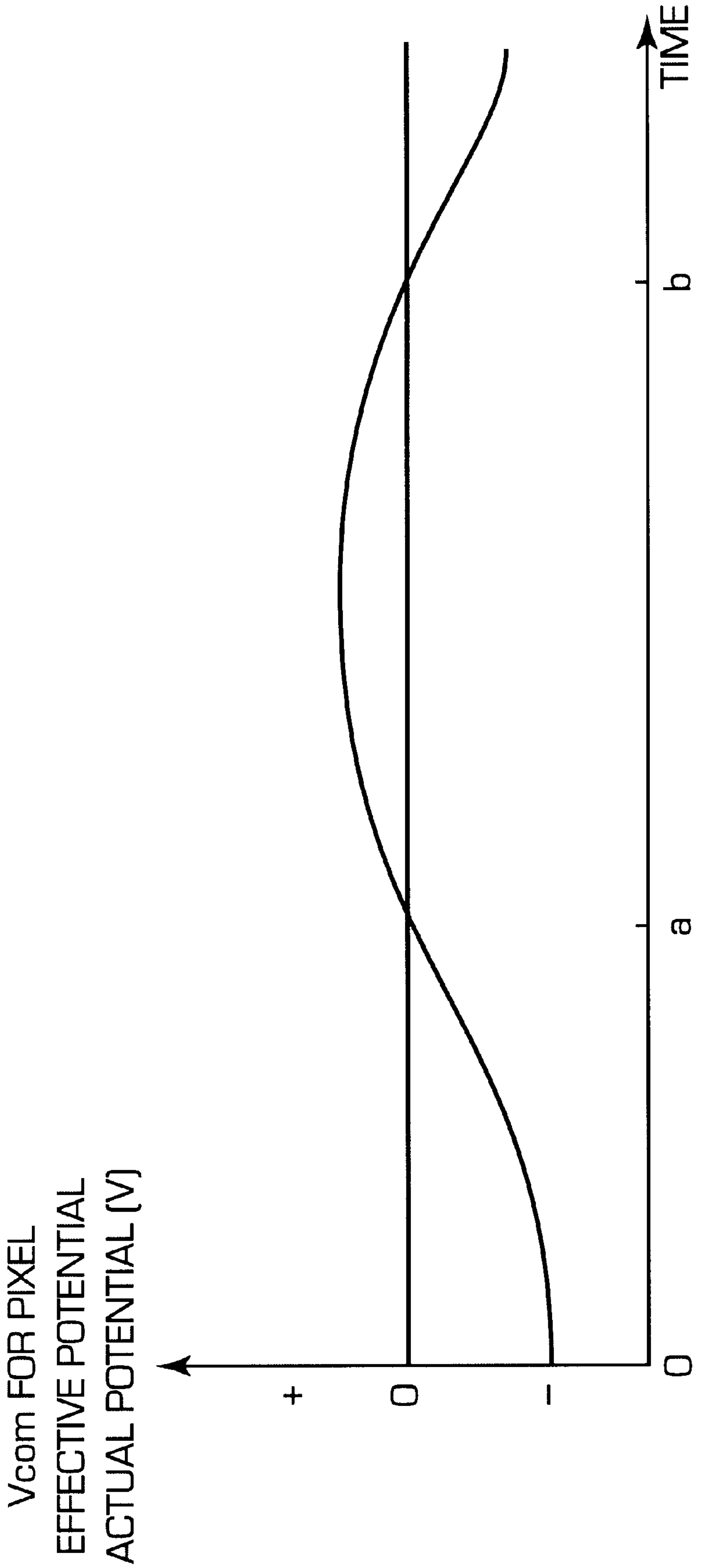
FIG. 13 is a diagram showing the effective potential of a common electrode with respect to a pixel electrode potential in the liquid crystal display device according to the second embodiment.

In FIG. 12, the AC voltage is a sine-wave AC voltage having a period of about 24 hours, and varies gradually with time. The AC voltage has an amplitude of about ±0.2 V.

Figure 14:
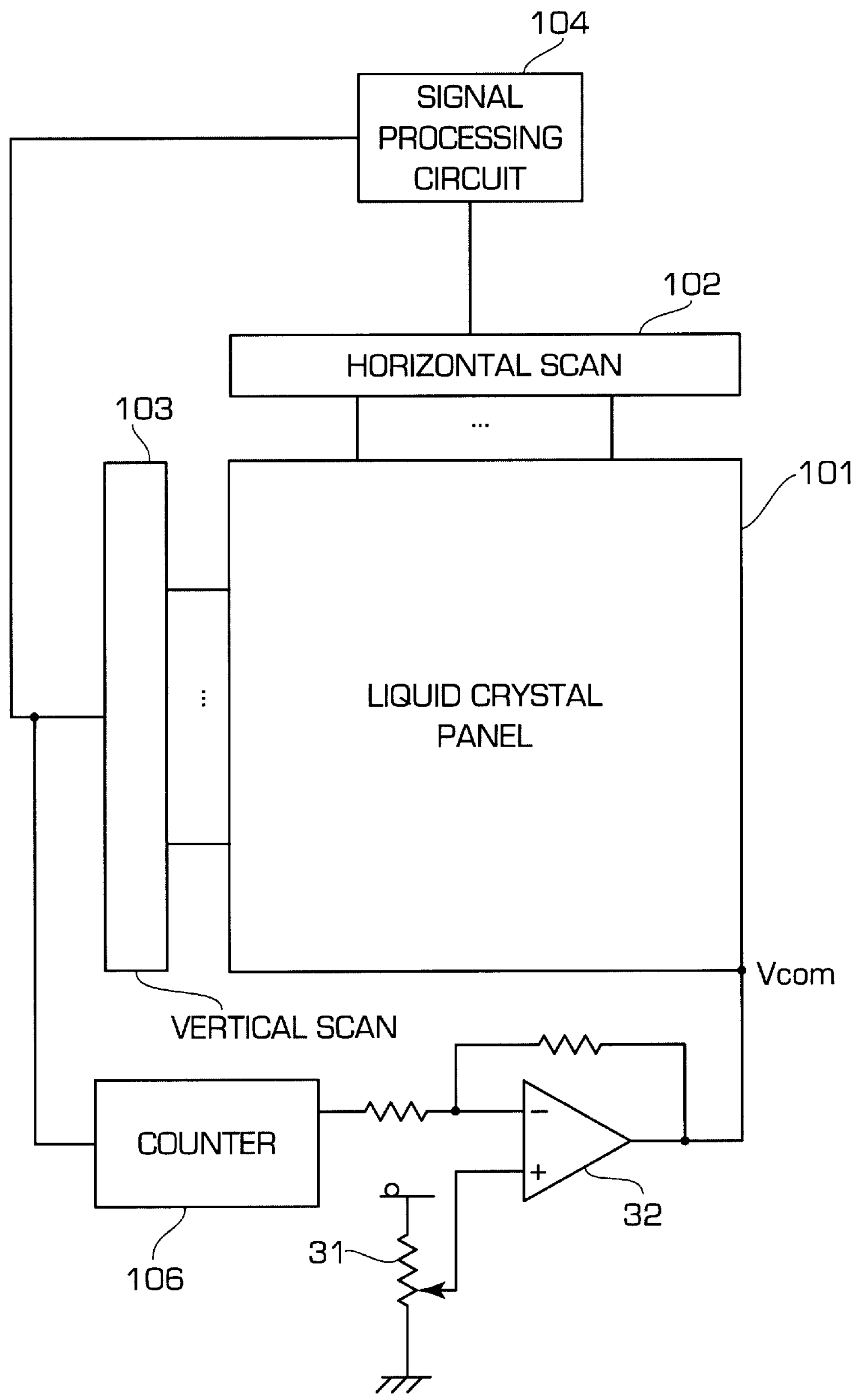
FIG. 14 is a block diagram of the liquid crystal display device according to the second embodiment.

FIG. 14 shows a block diagram of the liquid crystal display device according to the second embodiment, associated with a circuit for applying the AC voltage shown in FIG. 12.

In FIG. 14, the frequency of a clock signal CLK generated by signal processing circuit 104 is lowered (divided), e.g., from 60 Hz to 30 mHz, by down counter 106. The amplitude of a signal outputted from down counter 106 is amplified by operational amplifier 32, which applies the amplified signal to a common electrode of liquid crystal panel 101. Voltage offset circuit 31 is adjusted to set the central value of the common electric potential to the central value of a pixel electrode potential at the time of displaying an intermediate tone.

At this time, an effective voltage (DC component) applied to the liquid crystal cell varies by about ±0.2 V in each period of one hour.

In the second embodiment, any constant and unidirectional DC voltage is not applied effectively to the liquid crystal cell for a long period of time. Therefore, an electric double layer of liquid crystal impurities is prevented from being developed, and polarization in the orientation films is prevented from being fixed, so that any residual image will not be left for a long period of time. Though the gradation of a displayed pattern varies, the variation of the gradation is so small and gradual that it is not perceptible to the human eye.

According to the present invention, as described above, the polarity of the common electrode potential with respect to the pixel electrode potential is inverted at a high frequency to reduce or prevent the development of an electric double layer due to residual ions in the liquid crystal cell and also reduce or prevent polarization in the orientation films, so that any residual image will not be remained for a long period of time after the same pattern has been displayed for a long period of time.

Although certain preferred embodiments of the present invention have been shown and described in detail, it should be understood that various changes and modifications may be made therein without departing from the scope of the appended claims.

What is claimed is:

1. A liquid crystal display device comprising:

a matrix of pixel electrodes, a transistor mounted substrate having a plurality of thin-film transistors, each of said thin-film transistors acting as a switching element for at least one of said pixel electrodes, respectively, a confronting substrate disposed in confronting relation to said transistor mounted substrate, said confronting substrate having a common electrode confronting said pixel electrodes, a liquid crystal material sealed between the substrates, a drive circuit for applying a voltage signal to said common electrode to create a voltage between said pixel electrodes and said common electrode, said liquid crystal display device further comprising:

means for applying a high-frequency voltage signal to said common electrode.

2. A liquid crystal display device comprising:

a matrix of pixel electrodes, a transistor mounted substrate having a plurality of thin-film transistors, each of said plurality of thin-film transistors acting as a switching element for at least one of said pixel electrodes, respectively, a confronting substrate disposed in confronting relation to said transistor mounted substrate, said confronting substrate having a common electrode confronting said pixel electrodes, a liquid crystal material sealed between the substrates, a drive circuit for applying a voltage between said pixel electrodes and said common electrode, said liquid crystal display device further comprising:

means for applying an AC voltage, which varies gradually with time in periods of about one hour or more, to said common electrode.

3. The liquid crystal display device of claim 2, wherein said AC voltage has a sinusoidal form and a period of approximately one day.

4. The liquid crystal display device of claim 2, wherein said AC voltage has a small amplitude of approximately 0.2 volts.

5. A liquid crystal display device according to claim 1, wherein said liquid crystal material comprises a material which is slow in its responsiveness to high frequencies of said high-frequency voltage signal.

* * * * *